United States Patent
Mathieu

(10) Patent No.: US 7,154,051 B2
(45) Date of Patent: Dec. 26, 2006

(54) SKIRTING DUCT ANGLE CONNECTION ACCESSORY INCLUDING A BRANCHING COMPARTMENT

(75) Inventor: Tristan Mathieu, Dijon (FR)

(73) Assignees: Legrand France, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 10/981,602

(22) Filed: Nov. 5, 2004

(65) Prior Publication Data
US 2005/0135875 A1   Jun. 23, 2005

(30) Foreign Application Priority Data
Nov. 5, 2003   (FR) .................................. 03 12986

(51) Int. Cl.
*H02B 1/40* (2006.01)
(52) U.S. Cl. .................. 174/480; 174/481; 174/68.1; 174/68.3; 403/169; 403/217
(58) Field of Classification Search ............ 403/169, 403/170, 171, 176, 131, 205, 217, 218, 219, 403/382, 403, 344; 52/655.1, 261, 656.9, 52/280; 237/79; 248/68.1, 345.1; 174/48, 174/49, 95, 68.1, 68.3, 71 R, 72 R, 101, 174/480, 481; 49/383
See application file for complete search history.

(56) References Cited

U.S. PATENT DOCUMENTS

| | | | | |
|---|---|---|---|---|
| 5,332,866 A | * | 7/1994 | Sawamura ................ | 174/101 |
| 5,547,307 A | * | 8/1996 | Decore et al. ............ | 403/294 |
| 5,753,855 A | * | 5/1998 | Nicoli et al. ............. | 174/49 |
| 5,917,982 A | * | 6/1999 | Vargas et al. ............. | 385/134 |
| 6,002,087 A | * | 12/1999 | Albert et al. ............. | 174/48 |
| 6,037,543 A | * | 3/2000 | Nicoli et al. ............. | 174/72 R |
| 6,284,975 B1 | * | 9/2001 | McCord et al. .......... | 174/71 R |
| 6,323,421 B1 | * | 11/2001 | Pawson et al. ........... | 174/48 |
| 6,444,903 B1 | * | 9/2002 | Saeki et al. .............. | 174/48 |
| 6,478,499 B1 | * | 11/2002 | Fugman et al. .......... | 403/82 |
| 6,805,514 B1 | * | 10/2004 | Buard ...................... | 403/402 |
| 2001/0017214 A1 | * | 8/2001 | Saeki et al. .............. | 174/48 |
| 2003/0089515 A1 | * | 5/2003 | Federspiel et al. ....... | 174/48 |
| 2003/0173102 A1 | * | 9/2003 | Kishizawa ................ | 174/68.1 |

FOREIGN PATENT DOCUMENTS

| | | |
|---|---|---|
| EP | 0 921 616 | 6/1999 |
| FR | 2727578 | * 11/1994 |
| GB | 2 370 698 | 7/2002 |

* cited by examiner

*Primary Examiner*—Daniel P. Stodola
*Assistant Examiner*—Daniel J. Mills
(74) *Attorney, Agent, or Firm*—Young & Thompson

(57) ABSTRACT

An angle connection accessory is to be disposed at the junction between at least two skirting ducts extending in different directions. The angle connection accessory includes a plate having: a web; an inlet side face and an outlet side face that extend perpendicularly to at least one partition that is perpendicular to the web and that mutually isolates a first compartment and a second compartment; and an outlet face parallel to the partition via which firstly the first compartment opens directly to the outside, and secondly the second compartment also opens to the outside via a channel isolated from the first compartment and extending substantially perpendicularly to the partition between the second compartment and the outlet face. The plate includes two flaps hinged relative to each other via a hinge so as to form an angle between them, the channel extending at the join between the two flaps.

7 Claims, 3 Drawing Sheets

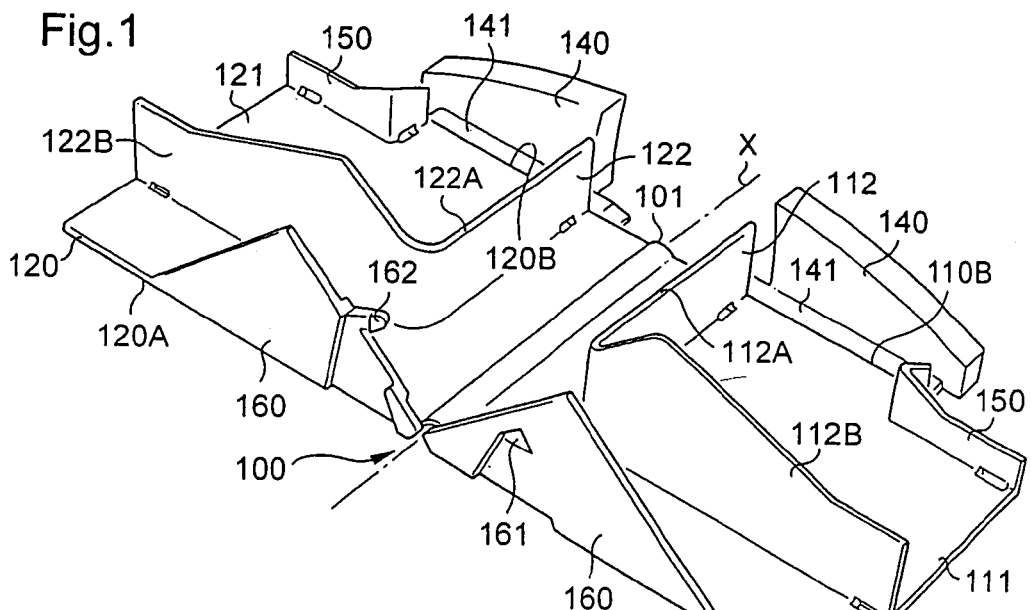
Fig. 1
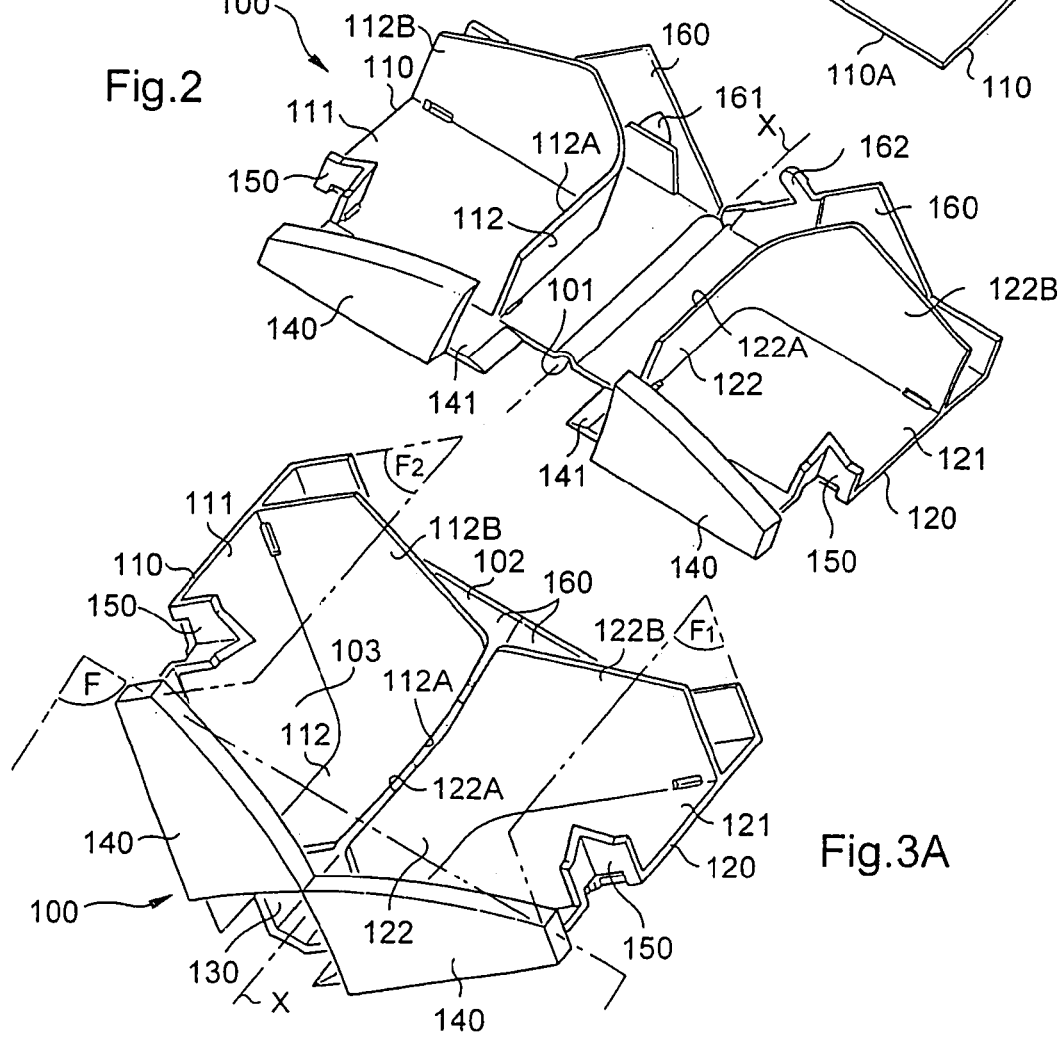
Fig. 2
Fig. 3A

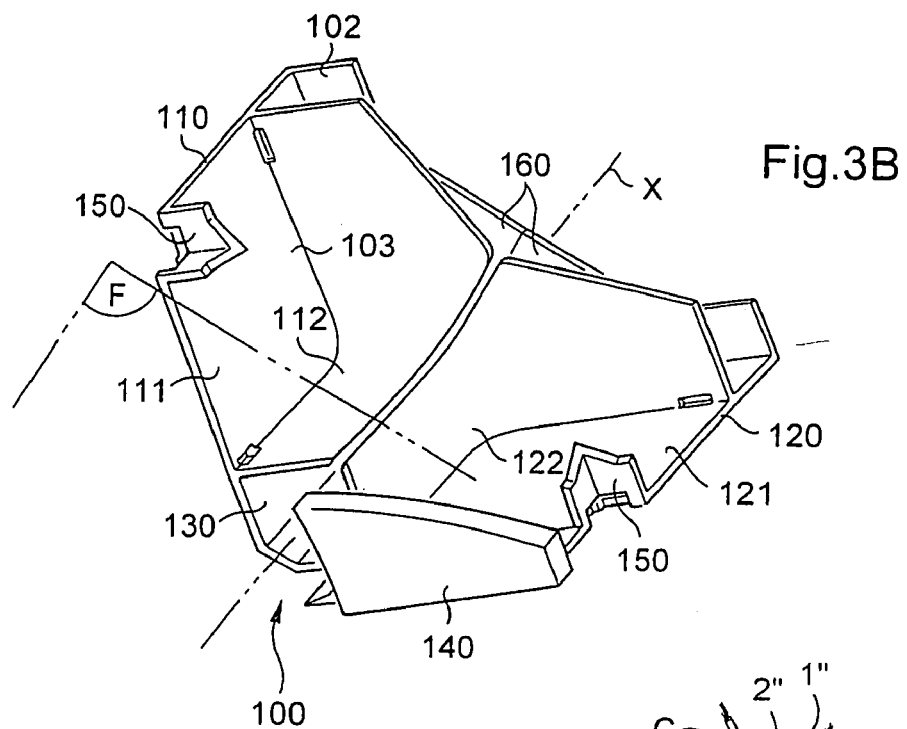
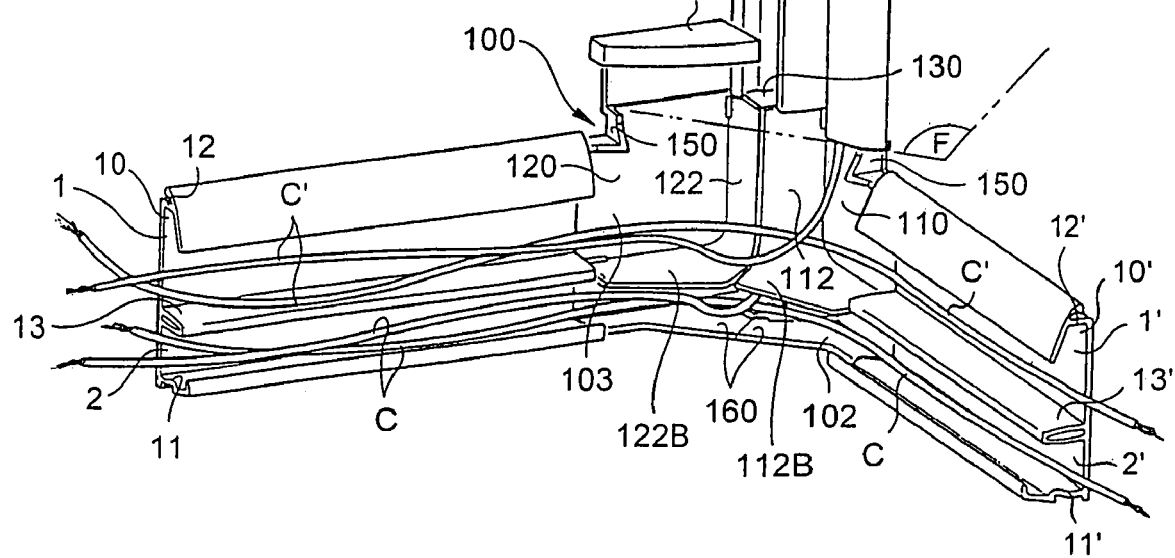

United States Patent US 7,154,051 B2

SKIRTING DUCT ANGLE CONNECTION ACCESSORY INCLUDING A BRANCHING COMPARTMENT

The present invention relates to an angle connection accessory to be disposed at the junction between at least two skirting ducts extending in different directions.

BACKGROUND OF THE INVENTION

It relates more particularly to an angle connection accessory comprising a plate having: a web; an inlet side face and an outlet side face that extend perpendicularly to at least one partition that is perpendicular to said web and that mutually isolates a first compartment and a second compartment; and an outlet face parallel to said partition via which firstly said first compartment opens directly to the outside, and secondly said second compartment also opens to the outside via a channel isolated from said first compartment and extending substantially perpendicularly to said partition between said second compartment and said outlet face.

The invention can be applied particularly advantageously to implementing a branching accessory to be disposed at the junction between an axial skirting duct and two side skirting ducts, each of which forms an angle, in practice a right angle, with the axial skirting duct.

Considering two walls forming an angle between them, the axial skirting duct can, for example, be disposed flush against one of the two walls along the corner, and each of the two side skirting ducts are disposed flush against a respective one of the two walls, e.g. by running in the manner of a skirting board at the base of said wall, the supports of the three skirting ducts then being channel-section. However, the axial skirting duct can also be disposed in the corner between the two walls, its support then having a substantially V-shaped cross-section.

A branching accessory comprising the above-mentioned characteristics is already known from Document GB 2 370 698 (see FIG. 4E). That accessory is designed to be positioned flush against a single wall at the junction between three skirting ducts.

OBJECTS AND SUMMARY OF THE INVENTION

Compared with the above-mentioned state of the art, the invention proposes an angle connection accessory as defined above, which accessory is designed to be positioned in particular in the corner formed by two walls, and makes it possible to divert cables coming from all of the compartments of a skirting duct to a direction substantially perpendicular to the axis of said skirting duct, while keeping them isolated from one another so as to bring them into the compartments of another skirting duct.

More particularly, according to the invention, the plate of the angle connection accessory comprises two flaps hinged relative to each other via a hinge so as to form an angle between them, said channel extending at the join between the two flaps.

Other non-limiting and advantageous characteristics of the angle connection accessory of the invention are as follows:

said partition is formed by two juxtaposed half-partitions;
said partition and said channel are formed by L-shaped ribs placed edge-to-edge;
said L-shaped ribs belong to said plate, each L-shaped rib projecting perpendicularly from one face of a flap;
said flaps are hinged relative to each other by a hinge;
said hinge results from a portion of thinner thickness being formed while the flaps and said hinge are being integrally molded from a plastics material;
it has at least one wall extending parallel to said partition and closing off a portion of the outlet face via which said first compartment opens to the outside; and
each wall is connected to an edge of said plate via a breakable link.

BRIEF DESCRIPTION OF THE DRAWINGS

What the invention consists of and how it can be implemented are clearly understood from the following description given with reference to the accompanying drawings which are given as non-limiting examples.

In the accompanying drawings:

FIG. 1 is a diagrammatic view of one side of a molded angle connection accessory of the invention as laid out flat;

FIG. 2 is a diagrammatic view of another side of the angle connection accessory of FIG. 1 as laid out flat;

FIG. 3A is a diagrammatic perspective view of the angle connection accessory of FIG. 2, as folded;

FIG. 3B is a diagrammatic perspective view of the angle connection accessory of FIG. 3A as ready to be put in place at the junction between a plurality of skirting ducts;

FIG. 4A is a diagrammatic perspective view of the angle connection accessory of FIG. 3B as in place at the junction between three skirting ducts, namely two side skirting ducts and one axial duct;

MORE DETAILED DESCRIPTION

The figures show an angle connection accessory to be disposed at the junction between at least two skirting ducts extending in different directions.

Figure 4B:
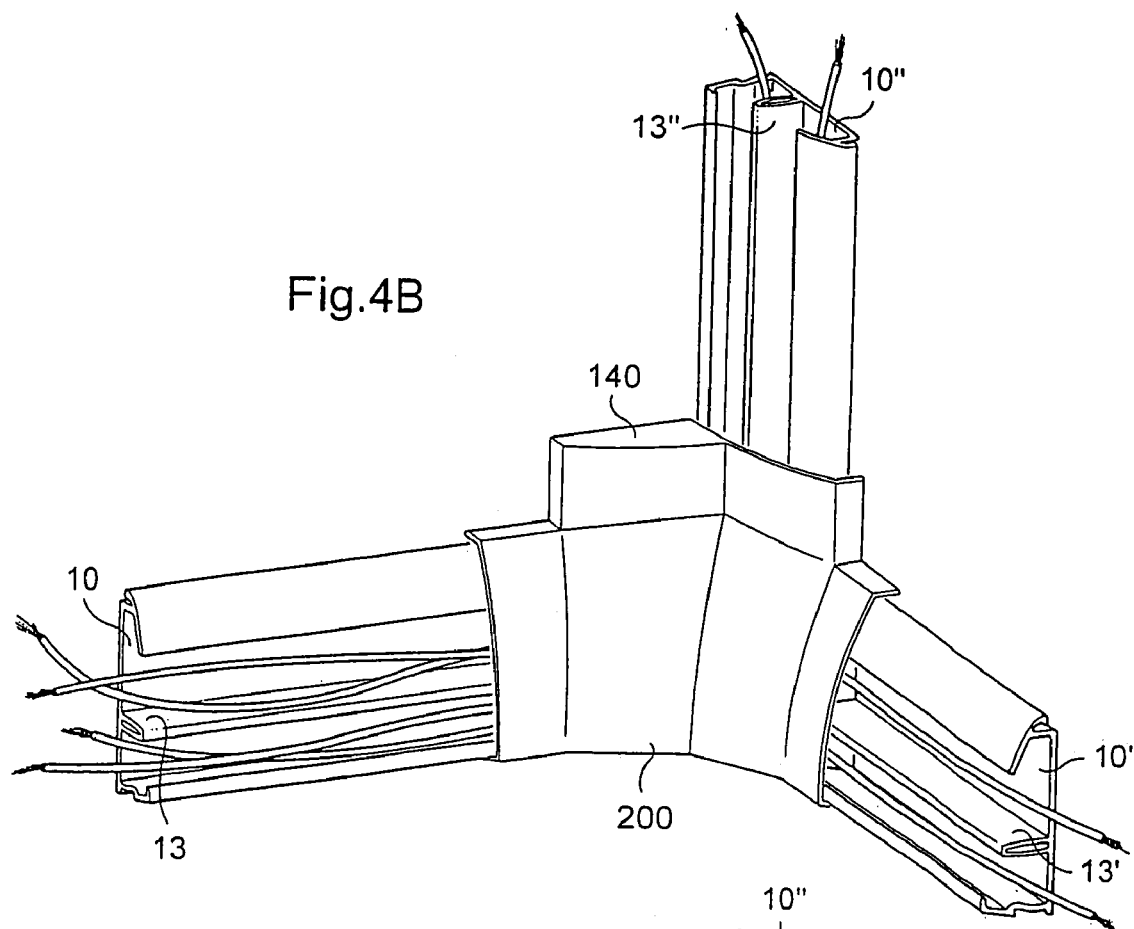
FIG. 4B is a view identical to the FIG. 4A view, showing the angle connection accessory closed by its mask.
Figure 4C:
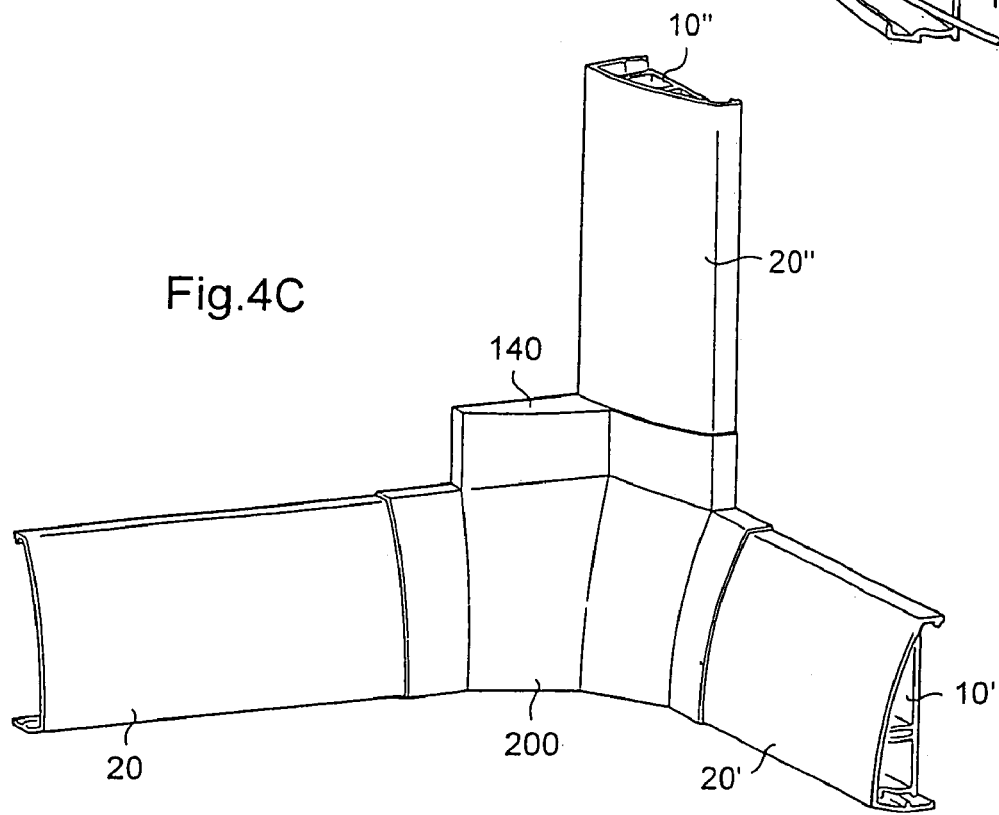
FIG. 4C is a view identical to the FIG. 4B view, showing the skirting ducts closed by their covers.

In this example, as shown in FIGS. 4A to 4C, this angle connection accessory is a branching accessory that is particularly well suited to connecting together three skirting ducts, namely an axial skirting duct and two side skirting ducts, each of which forms an angle, in practice a right angle, with the axial skirting duct.

Considering two walls that are at an angle to each other, the support 10" of the axial skirting duct is disposed flush against one of the two walls along the corner formed between said walls, and the supports 10, 10' of the two side skirting ducts are disposed flush against respective ones of the two walls, e.g. by running in the manner of a skirting board at the bases of said walls.

In this example, the supports 10, 10', 10" of the three skirting ducts are substantially channel-section with each of them having two side flanges 11, 12, 11', 12', 11", 12" flanking a web. In addition, the support 10, 10', 10" of each skirting duct carries a partition 13, 13', 13" which extends perpendicular to its web for the purpose of separating the space inside said support into two mutually isolated compartments 1, 2, 1', 2', 1", 2". Each support 10, 10', 10" of each skirting duct is closed by a cover 20, 20', 20" which is adapted to be mounted by snap-fastening onto the side flanges 11, 12, 11', 12', 11", 12" of said support 10, 10', 10". In this example, the covers 20, 20', 20" are said to be "wrap-around" because they wrap around and snap-fasten onto snap-fastening beads situated on the outside faces of said side flanges, so that they cover the lips carried by said side flanges and a portion of each of said side flanges.

The angle connection accessory 100 substantially comprises firstly a plate 100 which is designed to replace locally the support 10, 10', 10" of each of the skirting ducts (see FIG. 4A), and secondly a mask 200 that is mounted on said plate 100 so as to replace locally the cover 20, 20', 20" of each of the skirting ducts, preferably while covering the corresponding cut end of said cover (see FIG. 4C).

Naturally, the plate 100 and the mask 200 are provided with securing means which are suitable for holding them respectively relative to said skirting ducts.

As shown more particularly in FIGS. 1, 2, 3A, and 3B, the angle connection accessory includes first and second compartments 103, 102 defined between the web of the mask and the web 111, 121 of the plate 100 forming an angle, the compartments 103, 102 being separated from each other by a partition 112B, 122B which extends perpendicularly to the web 111, 121 of said plate from one transverse end edge thereof to the other.

In this example, the first compartment 103 is a top compartment and the second compartment 102 is a bottom compartment (see FIG. 4A).

Also in this example, the partition is part of the plate 100 and is formed by two half-partitions 112B, 122B juxtaposed when the angle is formed.

Naturally, in a variant (not shown), it is possible to make provision for said partition to belong to the mask, but distributing the cables in the resulting branching compartments would then be made somewhat more complicated.

The angle connection accessory conventionally has an inlet side face F1 and an outlet side face F2 for the cables and/or the electrical conductors. Said inlet side face F1 and said outlet side face F2 extend perpendicularly to said partition 112B, 122B carried by the web 111, 121 of the plate 100. Each of the mutually isolated first and second compartments 103, 102 of the angle connection accessory then opens directly towards the outside via the inlet and outlet sides faces F1, F2.

Advantageously, in the invention, in addition to the inlet and outlet side faces F1, F2, the angle connection accessory further has an "axial outlet" face F, parallel to said partition 112B, 122B, and via which said first compartment 103 opens directly to the outside, and secondly said second compartment 102 also opens to the outside via a channel 130 isolated from the first compartment 103, and extending substantially perpendicularly to said partition 112B, 122B between said second compartment 102 and said outlet face F (see FIGS. 3A, 3B, 4A).

When said plate 100 forms an angle, said channel 130 is situated in the angle formed by said plate 100.

In this example, the plate 100 is made up of two flaps 110, 120 that are secured together, and said channel 130 extends at the join (represented by the axis X in FIGS. 1, 2, 3A, and 3B) between the two flaps 110, 120.

Preferably, said partition 112B, 122B and said channel 130 are formed by two L-shaped ribs 112, 122 placed edge-to-edge.

The axial portions 112A, 122A (i.e. the portions extending along the axis X) of the two L-shaped ribs 112, 122 placed edge-to-edge, form two walls of the channel 130, and the radial portions 112B, 122B (i.e. the portions extending radially relative to the axis X). of the two juxtaposed L-shaped ribs 112, 122 form said partition separating the first and second compartments 103, 102 of the angle connection accessory. The back of the channel 130 is formed by a portion of the web 111, 121 of the plate 100.

In this example, said L-shaped ribs 112, 122 belong to said plate 100, each L-shaped rib extending perpendicularly from a face 111, 121 of a flap 110, 120.

Advantageously, said flaps 110, 120 are hinged to each other via a hinge 101 which extends along the axis X.

As shown in FIGS. 1 and 2, said hinge 101 results from a portion of thinner thickness being formed while the flaps 110, 120 and the hinge 101 are being integrally molded from a plastics material.

Said plate 100 is molded integrally in the form of a single flat piece (see FIGS. 1 and 2) and then the two flaps 110, 120 that carry respective ones of the two L-shaped ribs 112, 122 are brought towards each other by closing the hinge 101 so as to put said axial portions 112A, 122A of said L-shaped ribs 112, 122 edge-to-edge, thereby simultaneously forming, in the angle of said plate 100, the channel 130 and the two compartments 102, 103.

On one longitudinal edge, the plate 100, as laid flat when it is taken from the mold, carries two closure walls 160, each of which is connected to a respective edge 110A, 120A of a flap 110, 120, which walls are parallel to the half-partitions 112B, 122B. One of said closure walls 160 is provided with an opening or with a setback 161, the other of said closure walls 160 being provided with a fastening tooth or hook 162. Said fastening tooth or hook 162 is designed to co-operate with said opening or setback 161 in the first closure wall 160 when the two flaps 110, 120 are brought towards each other, in order to maintain the angular position of the flaps 110, 120 of the plate 100.

Once the plate 100 forms the desired angle, as shown in FIGS. 3A and 3B, the two closure walls 160 are mutually touching and they close the angle connection accessory at its bottom. Said second compartment 102 of the angle connection accessory is then defined at the top by the two half-partitions 112B, 122B forming said partition and at the bottom by said closure walls 160.

In addition, on the other longitudinal edge opposite from the edge carrying said closure walls 160, said plate 100 as laid out flat on being removed from the mold carries two end walls 140 also parallel to the half-partitions 112B, 122B forming said partition.

Each of the two end walls 140 closes off a portion of the outlet face F via which said first compartment 103 opens to the outside.

Each end wall 140 is connected to a corresponding edge 110B, 120B of a flap 110, 120 of said plate 100 via a breakable link 141 so that users can, at their convenience, remove said end wall in order to enable said first compartment 103 to gain access via said outlet face F to one of the compartments of the support 10" of the axial skirting duct (see FIGS. 3B and 4A). Each end wall 140 also makes it possible to close the top of the angle connection accessory when the mask 200 is mounted on said plate 100.

Naturally, the L-shaped ribs 112, 122, the closure walls 160 and the end walls 140 are situated on the same side of the plate 100.

In the embodiment shown, they are integrally molded with the plate 100 so that they form one piece with the flaps 110, 120 and with the hinge 101.

Finally, on its two transverse edges perpendicular to the longitudinal edges on which the closure walls 160 and end walls 140 are situated, the plate 100 as laid out flat carries two wedge-shaped walls 150 which project perpendicularly to the faces 111, 121 of said flaps 110, 120.

The wedge-shaped walls 150 are also advantageously formed integrally with the plate 100.

As shown in FIG. 4A, when the plate 100 of the angle connection accessory is disposed in the corner formed by two walls at an angle, then at the junction where the supports 10, 10', 10" of the side skirting ducts meet the axial duct, its web 121, 111 establishes the junction between the partitions 13, 13' of the supports 10, 10' of the side skirting ducts, and the L-shaped rib 112 establishes the junction between the partitions 13', 13" of the supports 10', 10" of the side skirting duct and of the axial skirting duct that are situated on the same wall.

The web 121, 111 of the plate 10 overlaps the webs of the supports 10, 10', 10" so that firstly end portions of the closure walls 160 of the plate 100 are pressed against the side flanges 11, 11' of said supports 10, 10' and wedged between lips of said side flanges 11, 11' and the corresponding webs, and, secondly end portions of the wedge-shaped walls 150 are pressed against the side flanges 12, 12', 12" of said supports 10, 10', 10" and wedged between the lips of the side flanges 12, 12', 12" and the corresponding webs. In this way, the plate 100 is held in place on the supports 10, 10', 10" while guaranteeing continuity for the side flanges of said supports.

The mutually isolated first and second compartments 103, 102 of the angle connection accessory then establish the junction respectively firstly between the top compartments 1, 1' of the supports 10, 10' and the compartment 1" of the support 10" of the axial skirting duct, and secondly between the bottom compartments 2, 2' of said supports 10, 10' and the compartment 2" of the axial skirting duct.

The first compartment 103 of the angle connection accessory opens via said inlet and outlet side faces F1, F2 directly into the top compartments 1, 1' of the supports 10, 10' of the side skirting ducts, and the second compartment 102 opens via said inlet and outlet side faces F1, F2 directly into the bottom compartments 2, 2' of the supports 10, 10' of the side skirting ducts.

In addition, the first compartment 103 of the angle connection accessory opens via said axial outlet face F directly into the compartment 1" of the support 10" of the axial skirting duct, and the second compartment 102 opens via said axial outlet face F, via the channel 130, isolated from the compartment 103, into the compartment 2" of the support 10" of the axial skirting duct.

As shown in FIG. 4A, the plate 100 keeps only one end wall 140 which is situated in the vicinity of the compartment 2" of the support 10" of the axial skirting duct, and which closes off the corresponding portion of the axial face F via which the first compartment 103 of the angle connection device opens to the outside. The other end wall 140 has been removed by the installer.

Thus, the cables C situated in the bottom compartment 2 of the support 10 of the side skirting duct pass through the bottom compartment 102 of the angle connection device so as to be brought directly into the bottom compartment 2' of the support 10' of the other side skirting duct or so as to be diverted into the bottom compartment 2" of the support 10" of the axial skirting duct via the channel 130, while remaining isolated from the cables C' situated in the top compartment 1 of the support 10 that pass through the top compartment 103 of the angle connection device so as to be brought directly into the top compartment 1' of the support 10' or so as to be diverted into the compartment 1" of the support 10" of the axial skirting duct.

As shown in FIGS. 4B and 4C, when the mask 200 of the angle connection device is mounted on the plate 100, the end wall 140 closes said angle connection device by matching the outline of said mask 200. Said mask is provided with fastening means similar to the fastening means of the covers 20 of said skirting ducts so as to fasten to the corresponding side flanges of said supports 10, 10', 10".

Thus, advantageously, the above-described angle connection device makes it possible to keep the isolation between the various compartments of the axial skirting duct and of the side skirting ducts.

The present invention is in no way limited to the embodiment described and shown, but rather the person skilled in the art can make any variant to it that lies within its spirit.

What is claimed is:

1. An angle connection accessory to be disposed at the junction between at least two skirting ducts that extend in different directions and that each has a support disposed flush against a wall, said angle connection accessory comprising a plate that extends from the support of each of the skirting ducts flush against the wall, the plate having:
   a web;
   an inlet side face and an outlet side face, each said side face extending perpendicularly to at least one partition that is perpendicular to said web and that mutually isolates a first compartment and a second compartment so that cables situated respectively in said first and second compartments are isolated from each other; and
   an outlet face parallel to said partition via which firstly said first compartment opens directly to the outside of the connection accessory, and secondly said second compartment also opens to the outside via a channel isolated from said first compartment and extending substantially perpendicularly to said partition between said second compartment and said outlet face so that the cables diverted from said second compartment via said channel remain isolated from the cables in said first compartment;
   wherein the plate comprises two flaps hinged relative to each other via a hinge so as to form an angle between them, said channel extending at the join between the two flaps.

2. An angle connection accessory according to claim 1, wherein said partition is formed by two juxtaposed half-partitions.

3. An angle connection accessory according to claim 1, wherein said partition and said channel are formed by L-shaped ribs placed edge-to-edge.

4. An angle connection accessory according to claim 3, wherein said L-shaped ribs belong to said plate, each L-shaped rib projecting perpendicularly from one face of a flap.

5. An angle connection accessory according to claim 1, wherein said hinge results from a portion of thinner thickness being formed while the flaps and said hinge are being integrally molded from a plastics material.

6. An angle connection accessory according to claim 1, having at least one wall extending parallel to said partition and closing off a portion of the outlet face via which said first compartment opens to the outside.

7. An angle connection accessory according to claim 6, wherein each wall is connected to an edge of said plate via a breakable link.

* * * * *